(12) United States Patent
Nussbaum et al.

(10) Patent No.: US 7,334,314 B2
(45) Date of Patent: Feb. 26, 2008

(54) WORK TREATMENT INSTALLATION

(75) Inventors: Jörg-Michael Nussbaum, Ludwigsburg (DE); Klaus Strohhäcker, Ludwigsburg (DE)

(73) Assignee: Cross Hüller GmbH, Ludwigsburg (DE)

( * ) Notice: Subject to any disclaimer, the term of this patent is extended or adjusted under 35 U.S.C. 154(b) by 172 days.

(21) Appl. No.: 11/351,076

(22) Filed: Feb. 9, 2006

(65) Prior Publication Data

US 2006/0179639 A1    Aug. 17, 2006

(30) Foreign Application Priority Data

Feb. 16, 2005  (EP) .................................. 05003225

(51) Int. Cl.
*B23Q 7/00* (2006.01)
(52) U.S. Cl. .......................... 29/564; 29/558; 198/358; 414/222.01; 901/8
(58) Field of Classification Search .................. 29/563, 29/564, 557, 558, 33 P; 198/358, 574, 468.2, 198/346.1, 346.3, 377.07, 470.1; 901/8; 212/333, 334; 409/131, 231, 163, 164; 414/222.01, 414/222.03, 222.07, 222.08, 222.09, 591; 483/14, 15
See application file for complete search history.

(56) References Cited

U.S. PATENT DOCUMENTS

| 3,576,540 | A | * | 4/1971 | Fair et al. ....................... 29/563 |
| 4,251,957 | A | * | 2/1981 | Terahara ......................... 901/8 |
| 4,711,016 | A | * | 12/1987 | Genschow et al. ........... 29/563 |
| 5,368,539 | A | * | 11/1994 | Mills et al. .................... 29/558 |
| 5,920,974 | A | * | 7/1999 | Bullen ......................... 29/33 K |
| 6,325,591 | B1 | * | 12/2001 | Focke et al. .............. 414/749.1 |
| 6,722,836 | B2 | * | 4/2004 | Jager ...................... 414/222.01 |
| 2001/0054535 | A1 | * | 12/2001 | Faitel ....................... 198/346.3 |

FOREIGN PATENT DOCUMENTS

| DE | 34 28 992 C1 | 11/1985 |
| EP | 1 430 990 A1 | 6/2004 |

* cited by examiner

*Primary Examiner*—Dana Ross
(74) *Attorney, Agent, or Firm*—McGlew and Tuttle, P.C.

(57) ABSTRACT

A work treatment installation comprises several side-by-side machine tools and at least one work supply and discharge device. It further comprises a work transport device which bridges both of them and comprises a displaceable and vertically sliding lifting skid with a work grab. The work transport device comprises lowering stops for the lifting skid. They are fixed between charge and discharge positions of the machine tools and designed for engagement and disengagement in the charge and discharge positions.

9 Claims, 4 Drawing Sheets

WORK TREATMENT INSTALLATION

BACKGROUND OF THE INVENTION

1. Field of the Invention

The invention relates to a work treatment installation, comprising a plurality of side-by-side machine tools; at least one work supply and discharge device; a work transport device connecting the machine tools and the at least one work supply and discharge device; the work transport device comprising a loader which is disposed above the machine tools and the at least one work supply and discharge device; the loader being embodied for displacement between charge and discharge positions above the machine tools and at least one pick-up and drop-down position above the at least one work supply and discharge device, and comprising a vertically displaceable lifting skid which has a work grab.

2. Background Art

In a work treatment installation of the generic type, so-called overhead tanks are customarily provided between adjacent machine tools, preventing any carry-over of coolant and lubricant that may drop off a work-piece from the machine tools. Moreover these overhead tanks are intended to preclude any persons from being put in jeopardy when the work loader is erroneously lowered between the machine tools. Those overhead tanks are therefore made of comparatively strong sheet metal. By alternative, additional safety doors are built in, which can be closed if necessary. Such solutions are complicated and costly.

SUMMARY OF THE INVENTION

It is an object of the invention to embody a work treatment installation of the generic type in such a way that any risks by the work loader being lowered erroneously, jeopardizing persons or parts of the installation, are avoided by simple means.

According to the invention, this object is attained by lowering stops being provided, preventing any lowering of the work grab between the charge and discharge positions. It is the gist of the invention generally to preclude any lowering of the loader at places where lowering cannot be desired for operational reasons. Places where lowering is required for operational reasons can be provided with engageable and disengageable lowering stops.

Further features, advantages and details of the invention will become apparent from the ensuing description of an exemplary embodiment, taken in conjunction with the drawing.

DESCRIPTION OF A PREFERRED EMBODIMENT

Figure 1:
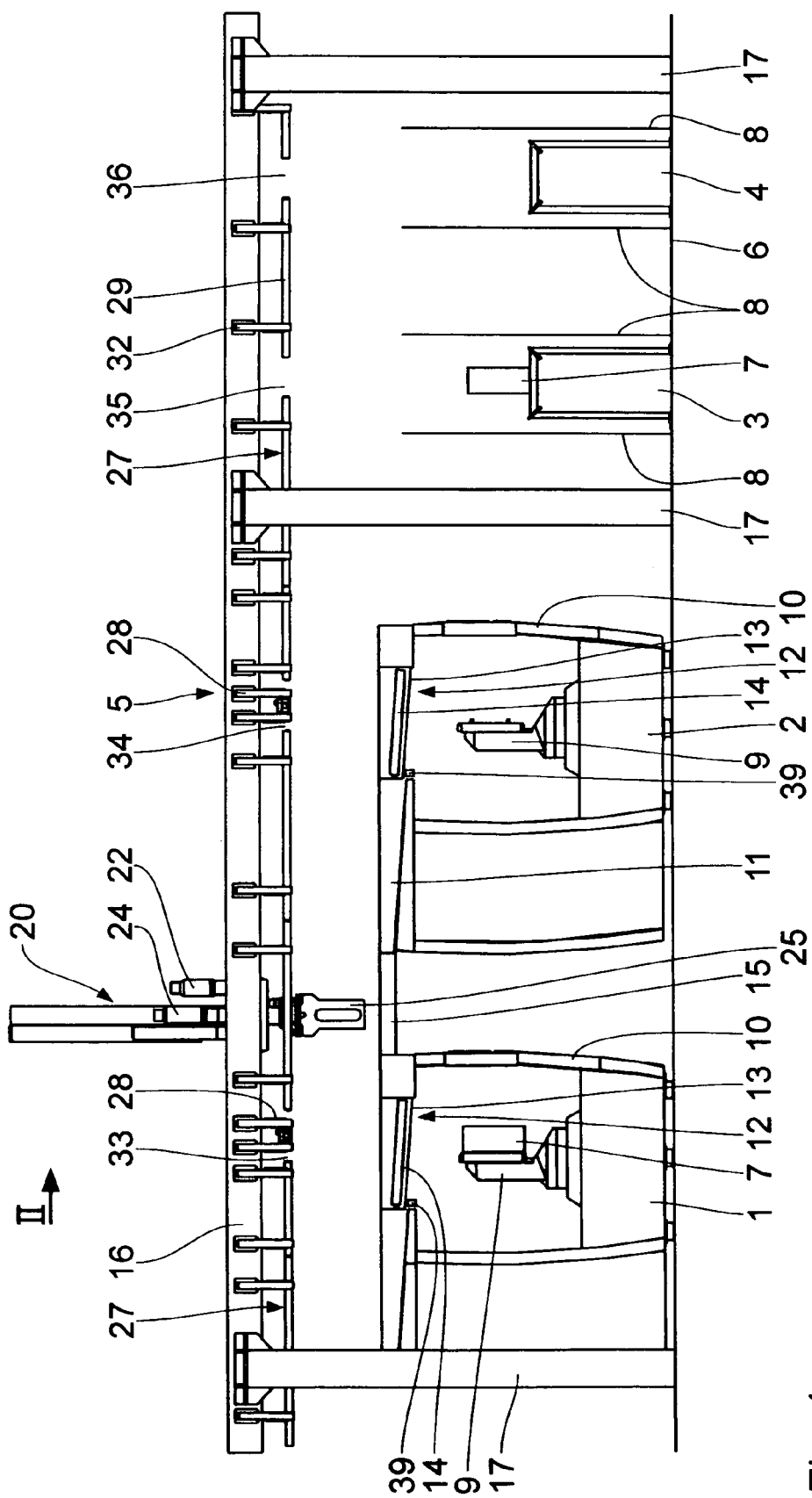
FIG. 1 is an elevation of a work treatment installation according to the invention.
Figure 2:
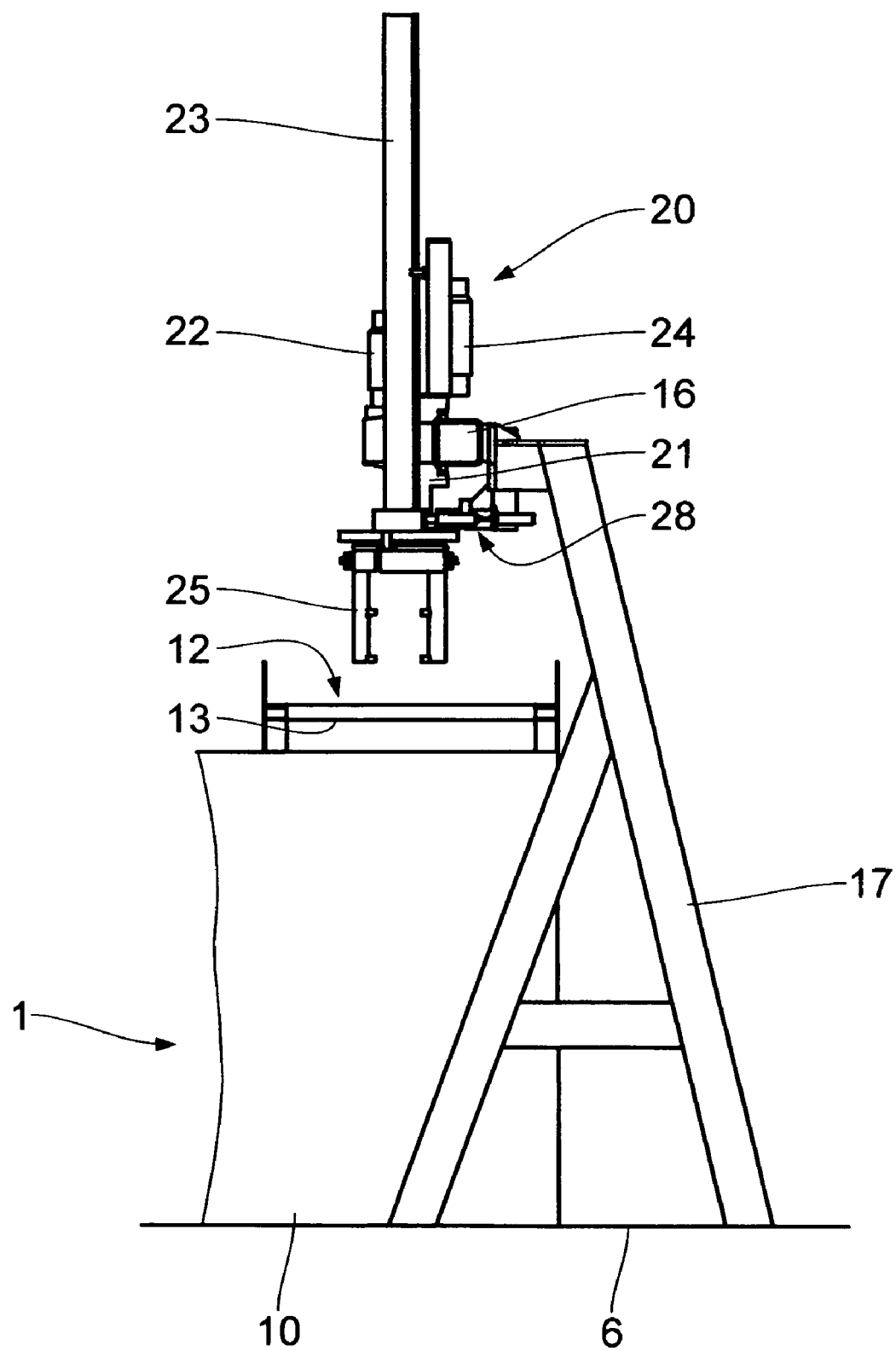
FIG. 2 is a lateral view of the installation in accordance with the arrow II of FIG. 1.

As seen in particular in FIG. 1, a work treatment installation comprises several machine tools 1, 2, a work supply device 3, a work discharge device 4 and a work transport device 5 uniting both. The machine tools 1, 2 and the devices 3, 4 support themselves on a foundation 6. The work supply device 3 serves for the supply of works 7, to be machined, to the work transport device 5; the work discharge device 4 serves for the discharge and further transportation of works that have been treated on the machine tools 1, 2. The devices 3, 4 are provided with protection fencing 8.

The machine tools 1, 2 comprise work holding fixtures 9 where the to-be-machined works 7 are held. The machine tools 1, 2 are enveloped by casings 10 which are closed upwards by a roof 11. A charge door 12 is disposed in the roof 11 above the work holding fixture 9; it can be closed by means of a lid 13. That lid 13 is opened and closed by means of a linear drive 14. The machine tools 1, 2 that neighbour the casings 10 are linked to one another in the vicinity of the respective roof by means of an overhead tank 15 of thin sheet metal which serves for collecting any lubricant or chips that may drop off.

The work transport device 5 comprises a longitudinal beam 16 which is disposed above the machine tools 1, 2 and devices 3, 4, supporting itself by props 17 on the foundation 6. The longitudinal beams 16 and the props 17 constitute a frame. This longitudinal beam 16 in the form of a caisson-type section is provided with guide rails 18, 19, with a work-7 loader 20 being movable thereon. The loader 20 comprises a skid 21 which is movable on the guide rails 18, 19 for travel, by means of a travel drive 22, along the guide rails 18, 19 i.e., along the longitudinal beam 16. A lifting skid 23 is mounted on the skid 21 for vertical displacement; it is movable by means of a lifting drive 24. The bottom end of the lifting skid 23 is provided with a work grab 25 of the type of pliers; it closes and opens by means of a grab driving mechanism 26, seizing and releasing a work 7.

Figure 3:
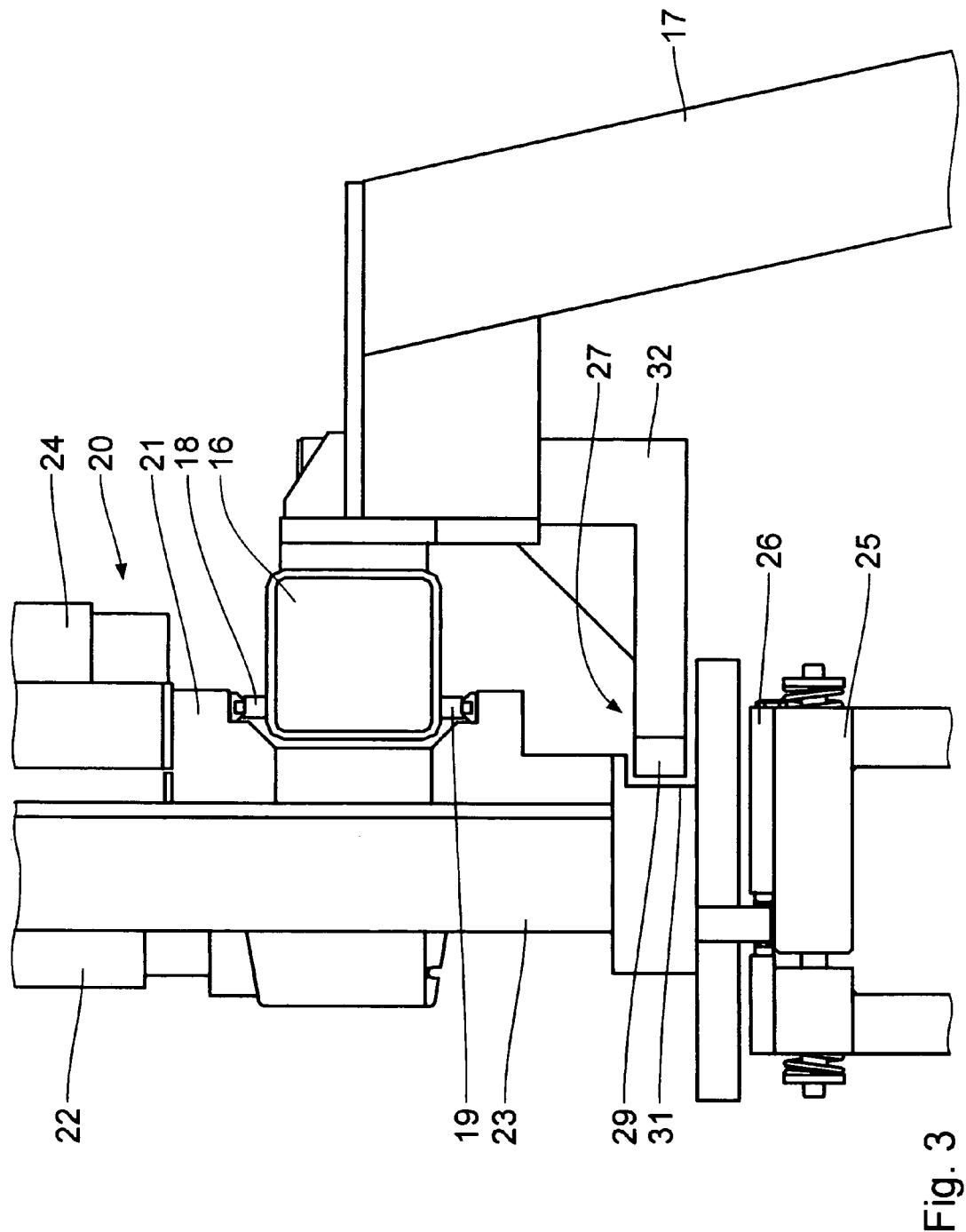
FIG. 3 is a partial lateral view of the installation with a stationary lowering stop.
Figure 4:
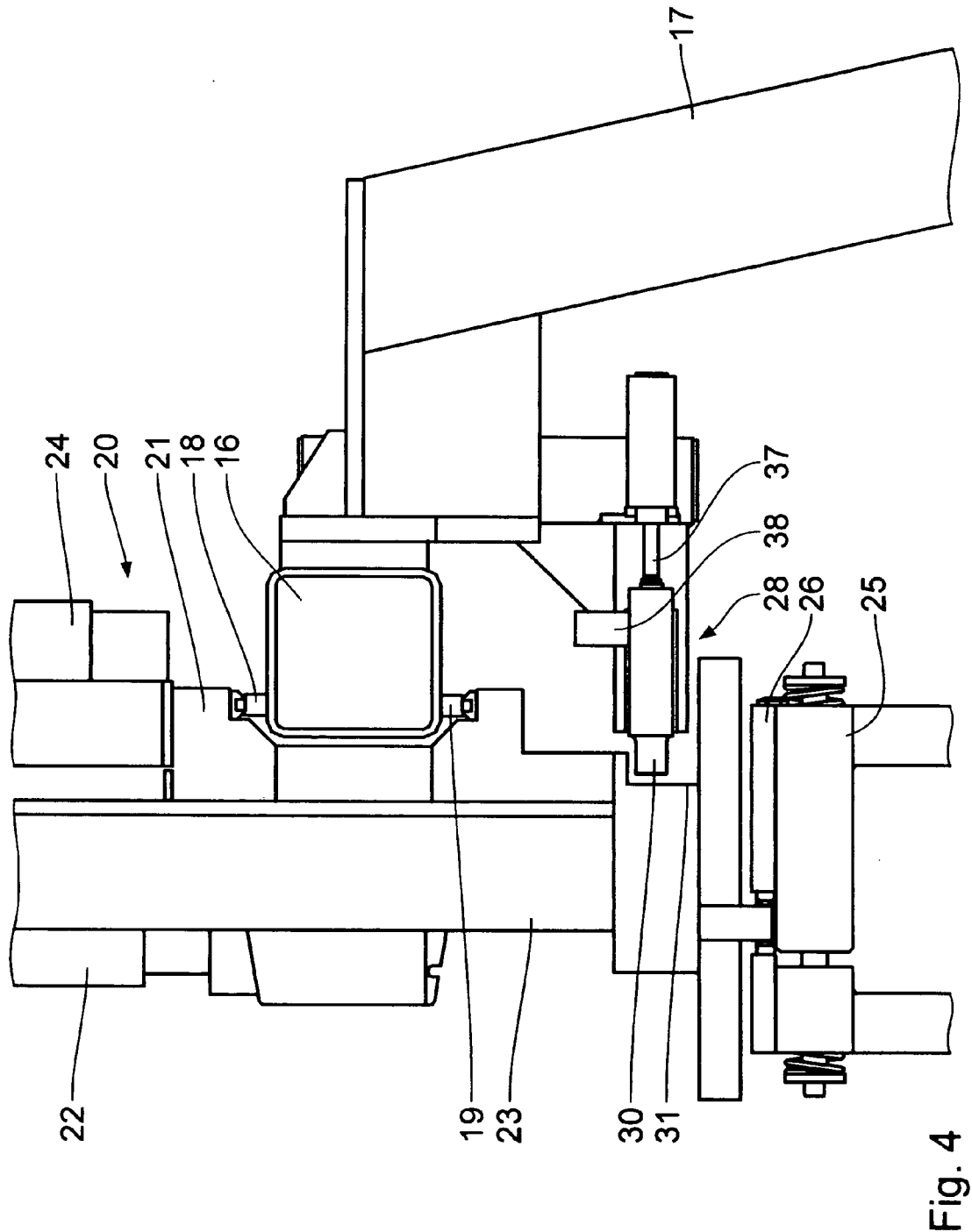
FIG. 4 is a partial lateral view, illustrating an engageable and disengageable lowering stop.

So as to avoid the loader 20 from being lowered inadvertently, lowering stops 27 and 28 are provided. They comprise rods 29 and 30 which run in the longitudinal direction of the longitudinal beam 16 and are mounted thereon, serving as latches and backing up from below a corresponding recess 31 on the bottom side of the lifting skid 23 and above the grab 25, as seen in particular in FIGS. 3 and 4. The stationary lowering stops 27 comprise rods 29 which are fixed to the longitudinal beam 16 by means of holding arms 32 and, consequently, do not change their position. Stationary lowering stops 27 of that kind are disposed along the entire distance travelled by the loader 20, with the exception of a position of charge and discharge 33, 34 located vertically above the charge doors 12 of the machine tools 1, 2 and above the pick-up position 35 of the supply device 3 and the drop-down position 36 of the discharge device 4. This is where gaps are provided between the rods 29 of the stationary lowering stops 27, as seen in FIG. 1. In the charge and discharge positions 33, 34 above the charge doors 12, the lowering stops 28 are embodied for engagement and disengagement. To this end, the rods 30 are operable horizontally and crosswise of the longitudinal direction of the longitudinal beam 16 by means of an engaging and disengaging drive mechanism 37. This drive mechanism 37 is regularly a linear drive, customarily a pneumatically actuated piston-cylinder drive. When a rod 29 and 30, respectively, engages with a recess 31 of the loader 20, functioning as a latch, then downward engagement by form locking is produced between the rod 29 or 30 and the loader 20.

A safety switch 38 ensures that the lowering stop 28 can only be released when the door 13, located there-under, is open. In like manner, the lids 13 may be provided with safety switches 39 which ensure that lowering the loader 20 is only possible when the charge doors 12 are open. No lowering stops are provided in the gaps that relate to the position of pick-up 35 and the position of drop-down 36.

What is claimed is:

1. A work treatment installation, comprising
a plurality of side-by-side machine tools (1, 2);
at least one work supply and discharge device (3, 4);
a work transport device (5) connecting the machine tools (1, 2) and the at least one work supply and discharge device (3, 4);
  the work transport device (5) comprising a loader (20) which is disposed above the machine tools (1, 2) and the at least one work supply and discharge device (3, 4);
    wherein the loader (20) is embodied for displacement between charge and discharge positions (33, 34) above the machine tools (1, 2) and at least one pick-up and drop-down position (35, 36) above the at least one work supply and discharge device (3, 4), and
    comprises a vertically displaceable lifting skid (23) which has a work grab (25); and
wherein lowering stops (27) are provided, preventing any lowering of the work grab (25) between the charge and discharge positions (33, 34).

2. A work treatment installation according to claim 1, wherein engageable and disengageable lowering stops (28) are provided in the charge and discharge positions (33, 34).

3. A work treatment installation according to claim 1, wherein the lowering stops (27, 28) are disposed on a supporting frame (16, 17) of the work transport device (5).

4. A work treatment installation according to claim 3, wherein the lowering stops (27, 28) comprise pairs of latches (29, 30) and recesses (31) which are allocated to the supporting frame (16, 17) and the lifting skid (23) and which, upon interengagement, preclude any lowering motion of the lifting skid (23).

5. A work treatment installation according to claim 4, wherein the latches are displaceable by an engaging and disengaging drive mechanism (37).

6. A work treatment installation according to claim 1, wherein the at least one pick-up and drop-down position (35, 36) above the at least one work supply and discharge device (3, 4) is free from a lowering stop.

7. A work treatment installation according to claim 1, wherein the charge and discharge positions (33, 34) are disposed vertically above charge doors (12) of the machine tools (1, 2).

8. A work treatment installation according to claim 7, wherein lids (13) are provided for closing the charge doors (12).

9. A work treatment installation according to claim 1, wherein overhead tanks (15) of thin sheet metal are disposed between neighbouring machine tools (1, 2).

* * * * *